May 14, 1940.  J. FERLA  2,200,268
APPARATUS FOR MANUFACTURING PIPES FROM A CEMENTITIOUS COMPOSITION
Filed Sept. 22, 1938  3 Sheets-Sheet 1

Inventor
John Ferla
by Henry Bloch
Attorney

May 14, 1940.  J. FERLA  2,200,268
APPARATUS FOR MANUFACTURING PIPES FROM A CEMENTITIOUS COMPOSITION
Filed Sept. 22, 1938   3 Sheets-Sheet 2

Inventor
John Ferla
by Henry Heck
Attorney.

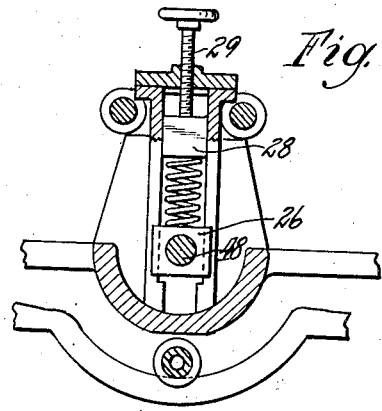

Patented May 14, 1940

2,200,268

UNITED STATES PATENT OFFICE 2,200,268

APPARATUS FOR MANUFACTURING PIPES FROM A CEMENTITIOUS COMPOSITION

John Feria, Chicago, Ill., assignor to Levi H. Blouch, Merchantville, N. J.

Application September 22, 1938, Serial No. 231,096

6 Claims. (Cl. 25—30)

The invention relates to an apparatus for manufacturing pipes from a cementitious composition.

It is an object of the invention to accelerate the manufacture of pipe by providing a runway enabling a plurality of mandrels to be stored in such runway and serially conveyed to a central position for forming the pipe thereon and subsequently advance to the unloading zone.

Another object aims at automatically lifting the hopper feeding material to the mandrel as the pipe increases in thickness.

A further object constitutes the provision of means for rendering a signal when a pipe is completed, so as to apprise the operator when the mandrel and the tube are to be unloaded.

Other and equally important objects will appear from a perusal of the invention to be described in the following specification, particularly pointed out in the claims forming a part thereof, and illustrated in the drawings, in which:

Fig. 3 is a section on the line 3—3 of Fig. 1.

Fig. 4 is a section on the line 4—4 of Fig. 1 and

Figs. 5 to 8 show various modifications.

Figures 1, 1A:
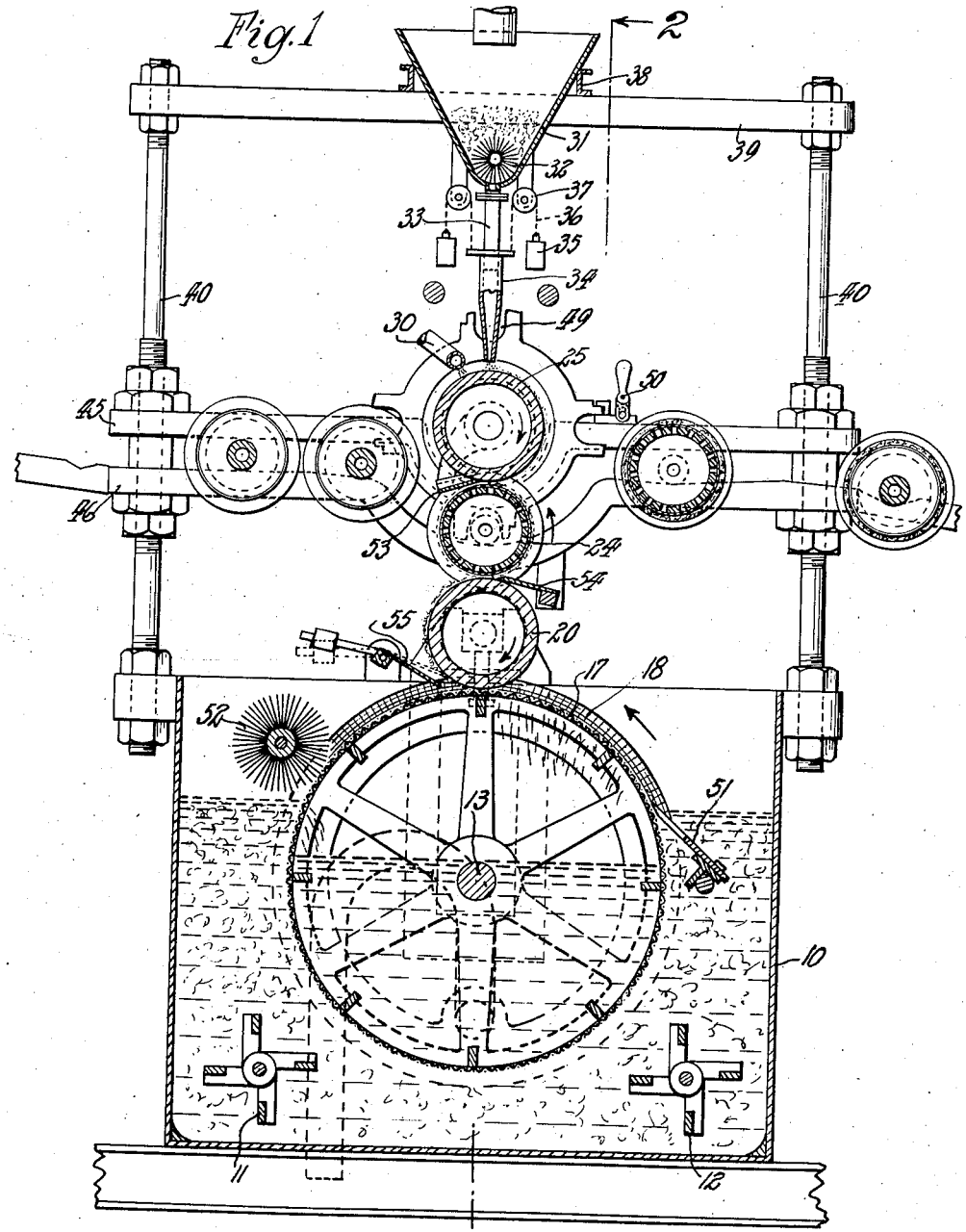
Fig. 1 is a sectional elevation of an apparatus, constructed in accordance with my invention.
Fig. 1a is a detail section.
Figure 2:
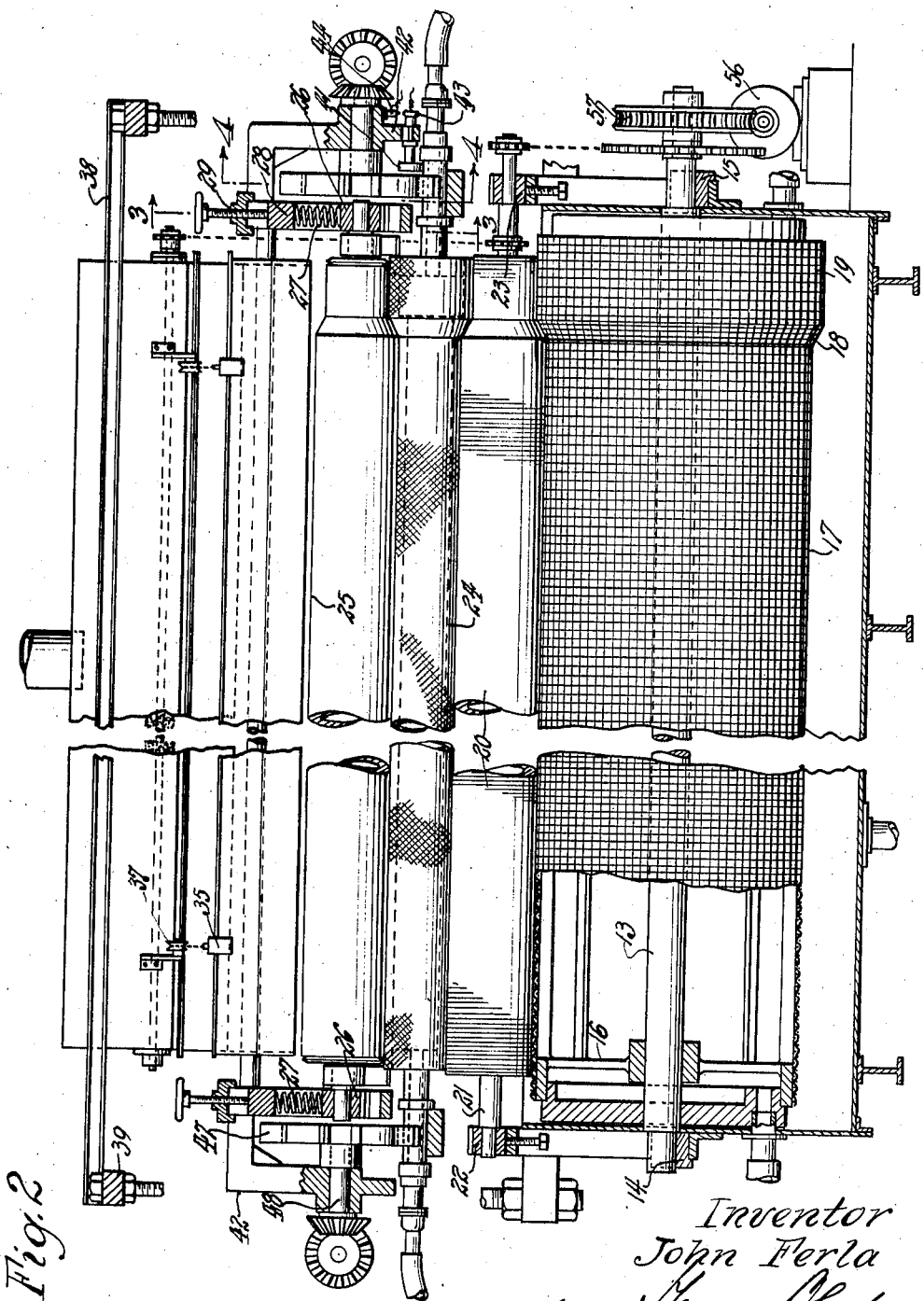
Fig. 2 is a section on the line 2—2 of Fig. 1.

Referring to the drawings, and particularly to Figs. 1 and 2, 10 designates a vat to which a liquid mixture is supplied, which is kept in agitation to maintain uniform consistency by a plurality of agitators 11 and 12.

A horizontal shaft 13 extends longitudinally through the vat and is supported in bearings 14 and 15 on the outside of the vat and attached thereto.

The shaft 13 carries a spider frame 16, on which is mounted a cylindrical screen 17 which, at the right end, as viewed in Fig. 2, is provided with a frusto-conical portion 18, and thence continues into a cylindrical portion 19 of larger diameter than the body portion of the screen.

A roll 20 is mounted on a shaft 21 which is journaled in bearings 22 and 23, provided on the shaft. The roll 20 is covered with fabric to facilitate the removal of the layer from the screen to the mandrel for deposit thereon.

The roll is provided with a serrated external surface and is adapted to pick up a layer of material from the molding screen 17 and transmit the same to a mandrel 24, whose interior is under vacuum. If desired, the mandrel may be covered by a layer of felt or fabric. The mandrel, being supported in bearings open at the top, may execute a vertical movement as the thickness of the layer thereon increases.

The right end of roll 20 is reduced to fit the contour of the screen 17 and similarly the right end of the mandrel 24 is shaped to be in contact with the roll 20.

Above the mandrel, and in engagement therewith, is a calender roll 25 journaled in bearings 26 maintained under the influence of a spring 27, controlled by a block 28 at the end of a set screw 29.

The calender roll 25 is moistened by the spray of a water pipe 30 and receives a deposit of dry material from a hopper 31, from which the discharge is controlled by a rotary brush 32 into a stationary hopper 33 and flows thence into a vertically adjustable hopper 34, which is held in position by counter weights 35 on cords 36, trained around pulleys 37, mounted on extensions of hopper 31 and secured to the hopper 34.

The calender roll recedes from the mandrel as the thickness of the pipe on the mandrel 24 increases, and the hopper 34 is moved upwards to allow for the receding of the calender roll.

The hopper is supported on channels 38 resting on cross beams 39, secured in any appropriate manner, to uprights 40 arising from the vat.

A pilot roller 41, adjustably mounted in a bracket bearing 42, engages the spindle of mandrel 24 and participates in a vertical rise due to the vertical movement of the mandrel under increasing thickness of the layers of dry and semi-dry material compressed thereon.

At a predetermined position, a contact 43 on the roller engages a cooperating contact 44 and closes a circuit through a signal (not shown) to apprise the attendant that a pipe is finished.

The ends of the spindle for the mandrel 24 extends in a loading track formed by members 45 and 46, supported by the uprights 40. The track is formed with an inclination to cause the mandrels to roll under gravity into pockets of carrying wheels and to roll out therefrom.

Carrying wheels 47 are mounted on stud shafts 48, supported in the bracket bearing 42. The wheels 47 are provided, equidistantly on the circumference, with pockets 49 in which the mandrel spindle is received, and are locked in position by a stop latch 50.

In operation, upon release of the latch and rotation of the wheel 47 one quarter turn, the mandrel in the loading track rolls downward due to the slope of the track and, its spindle having entered one of the pockets 49 of wheels 47, participates in the movement of the wheel, whereby the mandrel is placed in the central position.

The molding screen 17, being rotated, conveys a wet layer of fibrous material from the solution in vat 10 to the roll 20, which imparts the layer half way around the circumference of the mandrel, and the excess liquid enters the interior of the mandrel and is removed by the vacuum.

Simultaneously, dry material, slightly moistened, is delivered by the calender roll 25 onto the wet layer of the mandrel and consolidated therewith by the pressure of the calender roll.

A combination roll 51 forms rills in the wet layer in which the dry layer becomes anchored to ensure a homogeneous heavy layer on the screen 17, while a cleaning roll 52 removes adhering particles from the screen.

A blade 53 engages the calender roll 25 to remove the layer therefrom and likewise a blade 54 removes the layer from the pick up roll 20, while a blade 55 operates on the screen.

The drive of the apparatus is obtained from a motor 56, geared to a gear wheel 57 on the shaft 13, whence the drive to the various rolls is derived, as will be readily understood by those versed in the art.

In the modification shown in Fig. 5, the roll 20 is dispensed with and instead the mandrel 24 is in direct engagement with the screen 17, where a spreading roll 56 ensures a homogeneous heavy layer on the screen. In all other respects, the modification is identical to the first described embodiment.

In Fig. 6, a mandrel 57, of the non-vacuum type, is employed, there being a water spray from a pipe 58 to moisten the mandrel, prior to receiving the dry material from the hopper 34.

In Fig. 7, two calendar rolls 59, 60 are journaled in bearings 61, mounted on a bracket 62, secured to a rod 63, secured to a cross beam 64 connecting the hopper extensions and extending into an air cylinder 65.

It is evident that upon the pipe on the mandrel 24 becoming larger in diameter, the calender rolls will recede therefrom and the hoppers participate in the receding movement so as to be at constant distance from the surface of the calender rolls, ensuring thereby that, at all times, a uniform layer of moist material is superposed on the wet layer imparted to the mandrel 24 by the molding screen 17.

A pipe 66 discharges a water spray on the calender rolls 60 to cause moistening of the dry material and adherence to the calender roll.

The modification shown in Fig. 8 is similar to the modification shown in Fig. 7, except that the loading track 45, 46 and carrier wheel are shown.

While the drawings show preferred embodiments of the apparatus for carrying out my invention, numerous changes and alterations may be made without departing from the spirit of the invention.

I, therefore, do not limit myself to the details of construction and arrangement, as shown, but wish to claim my invention as broadly as the state of the art permits.

I claim:

1. In an apparatus for producing pipes from a cementitious composition, a vat containing liquid composition, a molding screen partly submerged in said liquid composition and rotatably mounted in said vat, a runway above said screen extending transversely thereto, a mandrel adapted to roll in said runway, and means for arresting said mandrel in position to receive a layer of composition from said screen, said runway being at a height above said screen to permit cooperation between said mandrel and said screen.

2. In an apparatus for producing pipes from a cementitious composition, a vat containing liquid composition, a molding screen partly submerged in said liquid composition and rotatably mounted in said vat, a calender roll, a hopper adapted to discharge dry composition material onto said roll, a runway between said screen and said hopper and extending transversely thereto, a mandrel adapted to roll under gravity in said runway, and means for securing said mandrel when positioned between said roll and said screen to receive liquid layers from said screen and dry layers from said calender roll until a pipe is formed.

3. In an apparatus for producing pipes from a cementitious composition, a vat containing liquid composition, a molding screen partly submerged in the liquid composition and rotatably mounted in said vat, a calender roll, an adjustable hopper adapted to discharge dry composition material onto said roll, a runway between said screen and said roll and extending transversely thereto, a mandrel adapted to roll under gravity in said runway, means for securing said mandrel when positioned between said calender roll and said screen to receive liquid layers from said screen and dry layers from said calender roll until a pipe is formed, and means for adjusting said hopper to allow for movement of said roll under increasing pipe thickness.

4. In an apparatus for producing pipes from a cementitious composition, a vat containing liquid composition, a molding screen partly submerged in the liquid composition and rotatably mounted in said vat, a calender roll, an adjustable hopper adapted to discharge dry composition material onto said roll, a runway between said screen and said roll and extending transversely thereto, a mandrel adapted to roll under gravity in said runway, means for securing said mandrel when positioned between said calender roll and said screen to receive liquid layers from said screen and dry layers from said calender roll until a pipe is formed, and means for automatically adjusting said hopper to remain at constant distance from said roll on its receding motion under increasing pipe thickness.

5. In an apparatus for producing pipes from a cementitious composition, a vat containing liquid composition, a molding screen partly submerged in the liquid composition and rotatably mounted in said vat, a calender roll, a hopper discharging dry composition material onto said roll, a runway extending transversely below said roll and above said screen, a mandrel adapted to roll under gravity in said runway into engagement with said roll and said screen, means for holding said mandrel in such engaging position to receive respectively liquid and dry layers from said screen and said roll until a pipe is formed, and means for automatically indicating when a pipe is completed on said mandrel.

6. In an apparatus for producing pipes from a cementitious composition, a vat containing the liquid composition, a molding screen partly submerged in said composition and rotatably mounted in said vat, a calender roll, a hopper adapted to discharge dry composition material onto said roll, a runway above said screen and below said hopper and extending transversely thereto, a mandrel adapted to roll loosely under gravity in said runway, and means for securing said mandrel against movement only when positioned between said calender roll and said screen to receive liquid layers from said screen and dry layers from said calender roll until a pipe is formed.

JOHN FERLA.